United States Patent [19]
Leipow

[11] Patent Number: 6,148,067
[45] Date of Patent: *Nov. 14, 2000

[54] ANONYMOUS VOICE COMMUNICATION

[75] Inventor: Robert Bernard Leipow, Millburn, N.J.

[73] Assignee: AT&T Corp., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/673,865

[22] Filed: Jul. 2, 1996

[51] Int. Cl.[7] .............................. H04M 3/42; H04M 3/56; H04Q 11/04
[52] U.S. Cl. ...................... 379/201; 370/259; 370/261; 370/389; 379/204; 379/207
[58] Field of Search .................................... 379/201, 202, 379/67, 88, 177, 204, 158, 67.1, 88.01, 207; 370/389, 259, 260, 261

[56] References Cited

U.S. PATENT DOCUMENTS

| | | | |
|---|---|---|---|
| 4,086,438 | 4/1978 | Kahn et al. | 379/158 |
| 4,635,251 | 1/1987 | Stanley et al. | 379/204 |
| 4,847,890 | 7/1989 | Solomon et al. | 379/67 |
| 5,086,394 | 2/1992 | Shapira | 379/201 |
| 5,623,536 | 4/1997 | Solomon et al. | 379/67 |
| 5,818,836 | 10/1998 | DuVal | 379/204 |

FOREIGN PATENT DOCUMENTS

| | | |
|---|---|---|
| 0 148 406 A2 | 7/1985 | European Pat. Off. . |
| 8616225 | 11/1986 | France . |
| 40 03 523 A1 | 8/1991 | Germany . |
| 195 45 248 A1 | 5/1996 | Germany . |

OTHER PUBLICATIONS

Herb Friedman, "Communications Corner", Radio Electronics, pp 98, 99, Nov. 1985.
"Internet Access : AT&T & Spanlink Communications to provide Telephone Links From the Internet For Secure Electronic Commerce" Edge Newsletter, Dec. 1995.
"Multi Call : WebCall—a real Virtual Call Center!" M2 Presswire Newsletter, Nov. 1995.

*Primary Examiner*—Harry S. Hong

[57] ABSTRACT

The invention provides a trusted agent for anonymous voice communication using telephones. The trusted agent includes an access network communications unit, a memory device and a voice bridge processor coupled to the memory device and the access network communications unit. The voice bridge processor receives information through the access network communications unit from at least one user and connects the at least one user to a telephone network for anonymous voice communication. The voice bridge processor displays to the at least one user a display panel prompting the at least one user to enter a telephone number and an identification. The voice bridge processor searches the memory device for an entry corresponding to the identification entered by the at least one user. If the entry corresponding to the identification is found, then the voice bridge processor connects the at least one user with another user identified with the identification entered by the at least one user. If the identification entered by the at least one user is not found, the voice bridge processor creates an entry in the memory device corresponding to the at least one user.

18 Claims, 7 Drawing Sheets

6,148,067

ANONYMOUS VOICE COMMUNICATION

BACKGROUND OF THE INVENTION

1. Field of the Invention

This invention relates to a method and apparatus for providing anonymous telephone communication.

2. Description of Related Art

Current computer network communications permit users to communicate with one another anonymously. For example, on-line service providers allow users to connect their personal computer (PCs) together and anonymously communicate with one another. On-line service users can elect to enter different "virtual rooms" which are places in which users can connect to within an on-line service in order to communicate with other users who have done the same. On-line service features such as text "chat" take place in these virtual rooms where users can send text to one another. On-line service virtual rooms are also known as "multi-user dungeons" or MUDs.

The users chatting in these virtual rooms identify each other by an ID such as "BOB44" that is arbitrarily assigned by each user. Thus, while messages between users may be identified by the ID, no other identification is accessible to any of the users. Hence, all the users in a virtual room remain anonymous while participating in meaningful communication.

Current technology does not provide anonymous communication beyond text messages such as described above. If two users in a virtual room desire to increase the level of their communications beyond text messages, they must choose to reveal their real identities or actual telephone numbers and use other communication methods such as calling each other over the telephone network or meeting each other face to face. However, these methods force the communicating parties to lose their anonymity. Thus, there is a need to provide anonymous communications beyond text messages currently available via on-line services and the Internet.

SUMMARY OF THE INVENTION

The invention provides for anonymous voice communications using telephones through a trusted agent. The trusted agent includes a network communications unit, a memory device and a voice bridge processor. The voice bridge processor is coupled to the network communications unit and the memory device and receives information through the network communications unit for at least one user and connects the at least one user to a communications network for the anonymous voice communication.

The voice bridge processor displays to the at least one user a display panel prompting the at least one user to enter a telephone number and an identification of an anonymous voice communication partner. After receiving the telephone number of the at least one user and the identification of the anonymous voice communication partner, the voice bridge processor reads the identification of the at least one user and searches the memory device for an entry corresponding to the identification of the anonymous voice communication partner that also identifies the identification of the at least one user as an anonymous voice communication partner.

If the entry corresponding to the identification of the anonymous voice communication partner is found in the memory device, then the voice bridge processor connects the at least one user with the anonymous voice communication partner over the communications network. If the entry corresponding to the anonymous voice communication partner is not found, then the voice bridge processor creates an entry in the memory device corresponding to the at least one user. The entry contains at least the telephone number of the at least one user, the identification of the at least one user and the identification of the anonymous voice communication partner.

If the identification entered by the at least one user is a voice room name, the voice bridge processor searches the memory device for an entry corresponding to the voice room name. If the entry corresponding to the voice room name is found, then the voice bridge processor connects the at least one user to a voice conference corresponding to the voice room name over the communications network. If the entry corresponding to the voice room name is not found, then the voice bridge processor initiates a voice conference corresponding to the voice room name, connects the at least one user to the voice conference and creates an entry in the memory device corresponding to the voice room name that includes information which identifies the corresponding voice conference.

The invention also provides a method for anonymous voice communication using telephones. The method includes receiving information from at least one user through a network communications unit and connecting the at least one user to a communications network for the anonymous voice communication.

BRIEF DESCRIPTION OF THE DRAWINGS

The invention is described in detail with reference to the following drawings, wherein like numerals represent like elements.

DETAILED DESCRIPTION OF PREFERRED EMBODIMENTS

The invention provides an apparatus and method for users to communicate anonymously by voice. The apparatus may be implemented by using hardware units such as application specific integrated circuits (ASICs) or by programs executed in a processor. The apparatus performs the role of a trusted agent where each party desiring anonymous communication entrust their personal identification such as a telephone number to the trusted agent. The trusted agent connects the anonymous parties to one another via voice communication, using their telephone numbers, without revealing to the participating parties the telephone numbers used, thus preserving anonymity.

Potential anonymous voice communicating parties may "meet" one another through available methods such as on-line "chat" rooms (MUDs) or through a common on-line friend. The parties may obtain the on-line ID's of the partners to whom they may want to communicate through the above conventional methods. They can then communicate anonymously via the trusted agent by voice over a voice communication network such as a telephone network using telephone stations. The anonymity of parties over voice telephone, may be useful for counseling (e.g. AIDS, 12-step or initial legal counseling), social (meet new people), or entertainment (hotline, psychic).

Figure 1:
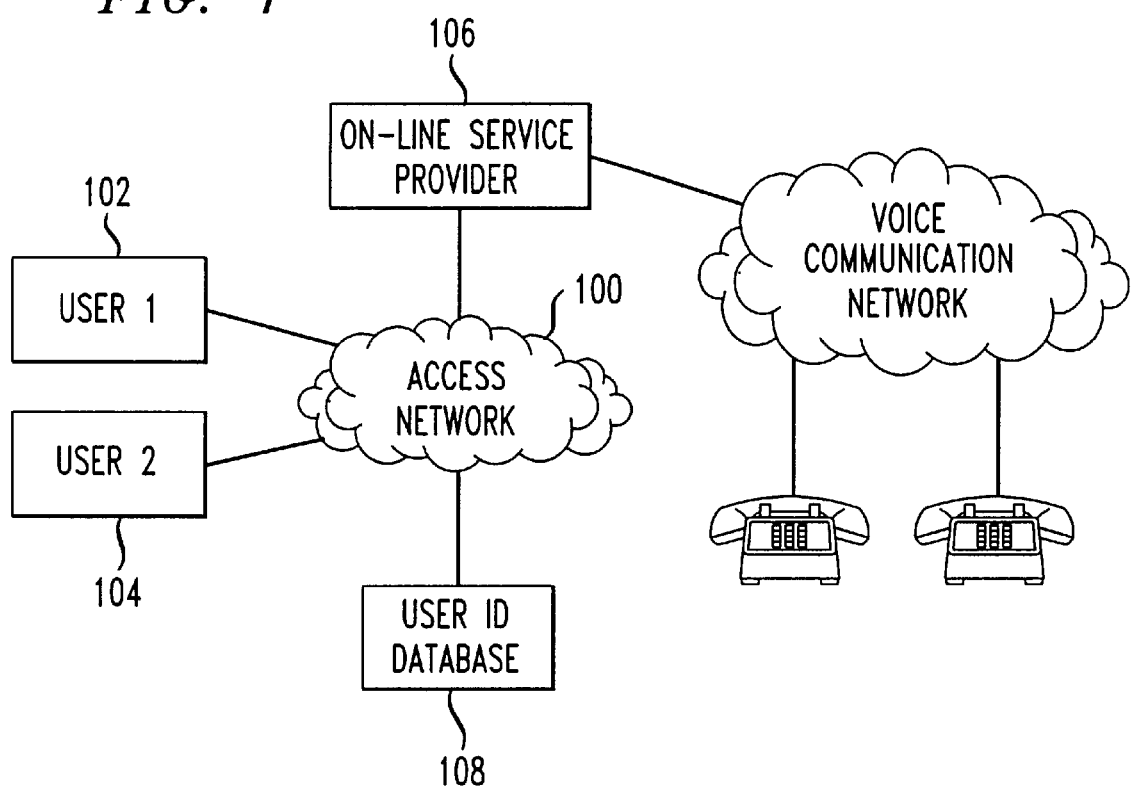
FIG. 1 is a block diagram of two users communicating over a computer network.

FIG. 1 shows users 102 and 104 communicating over an access network 100. Users 102 and 104 may be communicating directly with one another, however, direct communication between users 102 and 104 can only be accomplished if the users 102 and 104 are aware of each other's existence and know how to contact each other. To facilitate a mutual awareness of the users 102 and 104, databases such as user ID database 108 have been improved to provide features such as bulletin boards where users 102 and 104 may post their ID's for other users 102 and 104 to contact them.

On-line service provider systems, such as on-line service provider 106, provide further improvements over bulletin board systems by offering subscribing users 102 and 104 very convenient services such as "chat" discussed above so that subscribers gain ready access to other subscribers that share similar interests. A preferred embodiment of the invention is described below in the context of an on-line service, but the invention may be implemented in any communications context.

Figure 2:
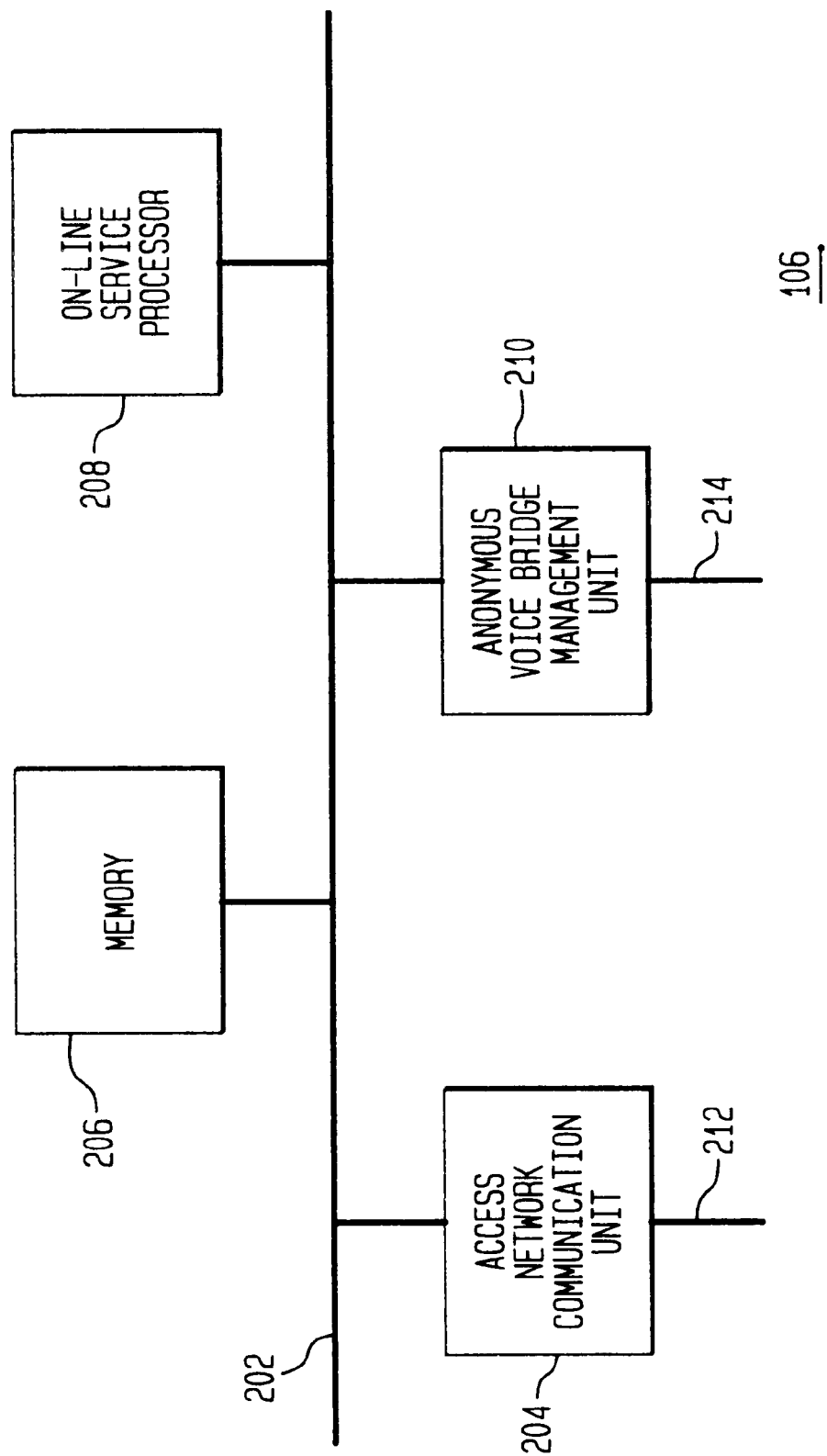
FIG. 2 is a block diagram of a on-line service provider system.

FIG. 2 is a block diagram of the on-line service provider system 106 that includes an on-line service processor 208 and a memory 206. The on-line service processor 208 executes programs that control an access network communication unit 204 and an anonymous voice bridge management unit 210. The access network communication unit 204 communicates with the access network 100 through signal line 212. The on-line service processor 208 communicates with the memory 206, the access network communication unit 204 and the anonymous voice bridge management unit 210 through signal line 202.

When a subscriber such as a user 102 logs in to the on-line service provider system 106, the on-line service processor 208 communicates with the user 102 communicating (via a personal computer for example) through the access network communication unit 204. Programs in the personal computer of the user 102 communicate with the programs executing in the on-line service processor 208 to display information on the personal computer screen and to receive information from the user 102 generated either by the user 102 through the keyboard or by automatic functions of the programs executing in the personal computer of the user 102.

If the user 102 decides to engage in anonymous voice communication by explicitly requesting such a service, the on-line service processor 208 transfers the user 102 to the anonymous voice bridge management unit 210 which takes on the role of a trusted agent. The anonymous voice bridge management unit 210 assumes control of the interaction with the user 102 and proceeds to query and receive information from the user 102 for the anonymous voice communication.

Figure 3:
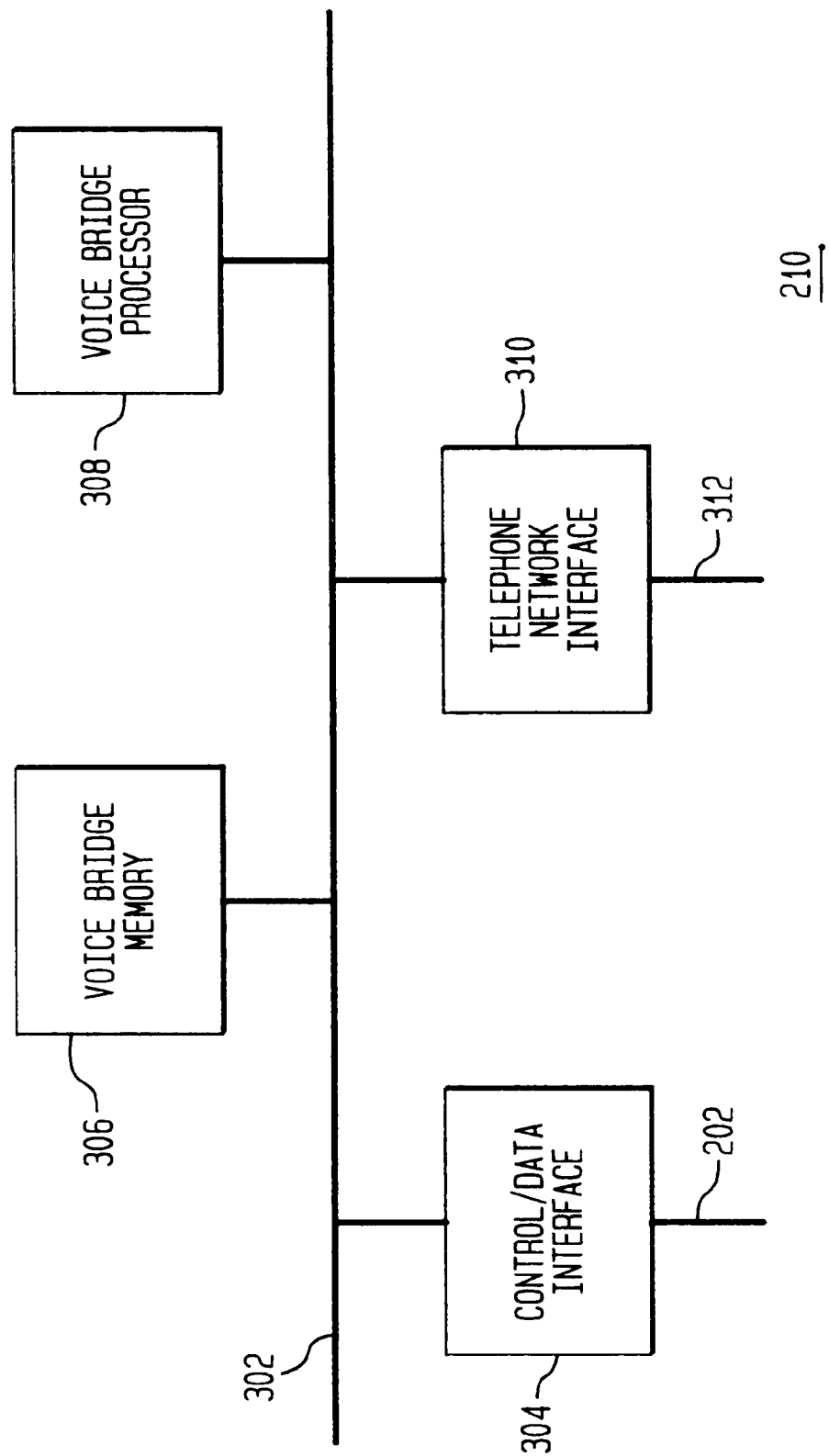
FIG. 3 is a block diagram of a voice bridge unit.

FIG. 3 is a block diagram of the anonymous voice bridge management unit 210 that includes a voice bridge processor 308, a voice bridge memory 306, a control/data interface 304 and a telephone network interface 310. All the above anonymous voice bridge management unit 210 components are interconnected by signal line 302. The control/data interface 304 connects the signal line 302 with the signal line 202 for communication with the on-line service processor 208 and the access network communication unit 204. The voice bridge processor 308 communicates with the user's personal computer through the control/data interface 304 and the access network communication unit 204 which is connected to the user's personal computer through the access network 100.

The telephone network interface 310 provides communication between the voice bridge processor 308 and a voice communications network connected through signal line 312. The access network may include networks such as the voice communications network or a data network.

Figure 4A:
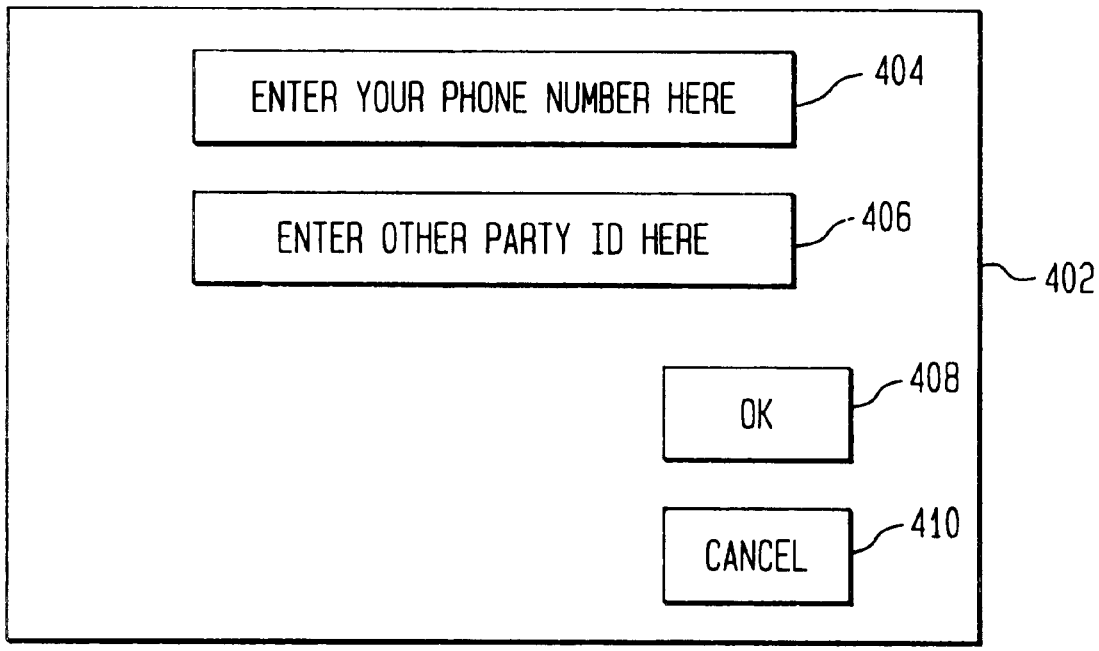
FIGS. 4A–4B are diagrams of a display panel for users that decide to engage in anonymous voice communication.

When a user 102 decides to engage in anonymous voice communication, the voice bridge processor 308 displays on the user's personal computer screen, for example, a display panel such as shown in FIG. 4A. In FIG. 4A, the display panel 402 includes four display areas 404, 406, 408 and 410. In the display area 404, the user is prompted to enter a telephone number that the user 102 desires to use for the anonymous voice communication. In the display area 406, the user is prompted to enter the ID of the other party with whom the user desires to talk to anonymously. The display area 408, displays "OK" and when selected, typically by a mouse click, indicates to the voice bridge processor 308 that the information in the display areas 404 and 406 is entered. The display area 410 displays "CANCEL" and when selected, indicates that the user 102 wishes to cancel the anonymous voice communication feature.

Figure 4B:
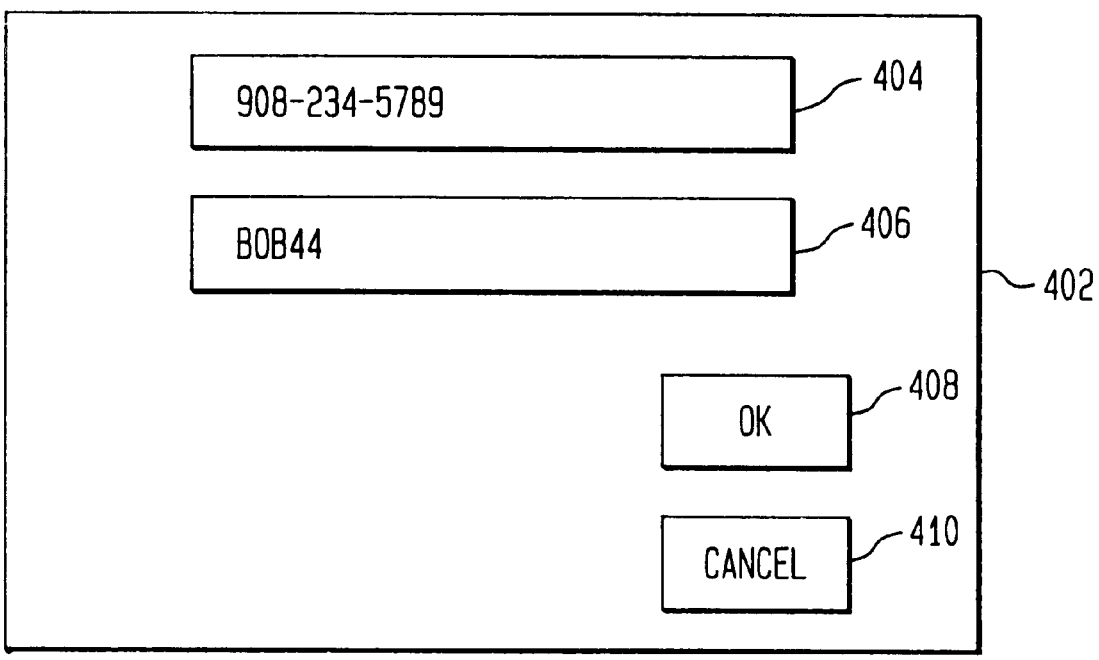

In FIG. 4B, the display panel 402 shows the information entered by the user 102 in the display areas 404 and 406. The display area 404 shows the telephone number "908-234-5789" as the telephone number that the user 102 wishes to use for the anonymous voice communication and the display area 406 contains the ID "BOB44" of the other party that the user 102 wishes to talk to anonymously. At this point, the user 102 may select "OK" in the display area 408 by either pointing and clicking with a mouse or using appropriate key strokes on a keyboard to indicate to the voice bridge processor 308 that the information in the display areas 404 and 406 may be used to connect the user 102 with the other party.

As multiple users 102 and 104 complete the respective panels 402, the voice bridge processor 308 connects the parties via the telephone network interface 310, which may serve as a voice bridge or manage available telephone network features such as telephone voice conferencing.

Usually only two users 102 and 104 would be involved. However, more than two users 102 and 104 can participate. The following discussion assumes two users 102 and 104 unless otherwise indicated.

Figure 5:
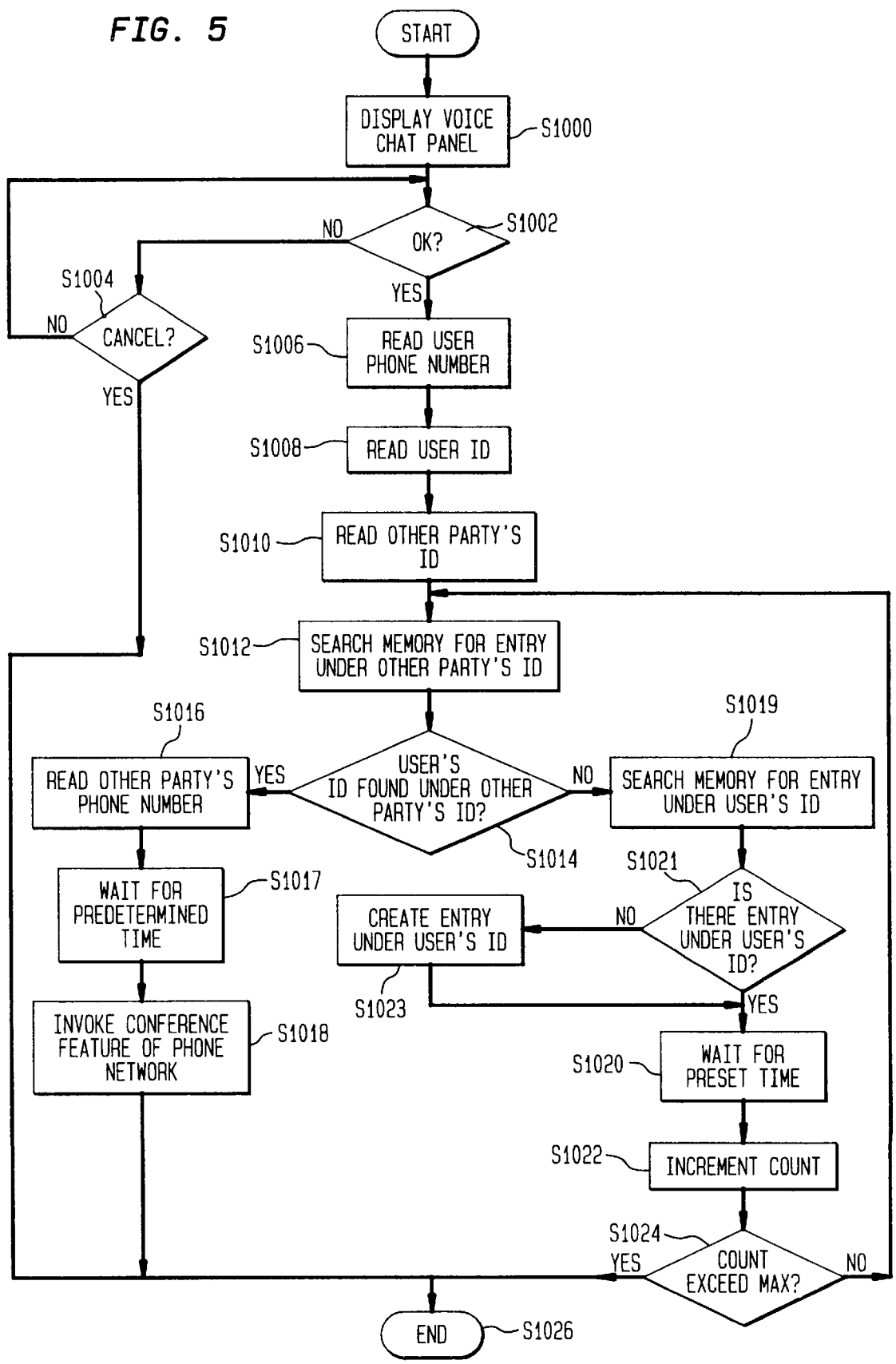
FIG. 5 is a process of a voice bridge processor that provides anonymous voice communication.

The voice bridge processor 308 interacts with each of two users 102 and 104 according to the process shown in FIG. 5. In step S1000, the voice bridge processor 308 displays the display panel 402 to the user 102 and then goes to step S1002. In step S1002, the voice bridge processor 308 checks if the user 102 has selected OK in the display area 408 by clicking with a mouse, for example. If the user 102 has selected OK, then the voice bridge processor 308 goes to step S1006. Otherwise, the voice bridge processor 308 goes to step S1004.

In step S1004, the voice bridge processor 308 checks if the user 102 has selected CANCEL in the display area 410. If the user 102 has selected CANCEL, then the voice bridge processor 308 enters step S1026 and ends the anonymous voice communication process and returns control to the on-line service processor 208. If the user 102 has not selected CANCEL, the voice bridge processor 308 returns to step S1002 and again checks if the user 102 has selected OK in the display area 408.

In step S1006, the voice bridge processor 308 reads the user's telephone number entered in the display area 404 and then goes to step S1008. In step S1008, the voice bridge processor 308 reads the ID of the user 102 which was stored in the memory 206 when the user 102 logged into the on-line service or when the user 102 selected the anonymous voice communication feature. Then the voice bridge processor 308 goes to step S1010. In step S1010, the voice bridge processor 308 reads the ID of the other party (BOB44 for user 104 for example) in the display area 406 and then goes to step S1012. After reading user 104's ID, the voice bridge processor 308 searches the voice bridge memory 306 for an entry corresponding to the ID of the user 104. Because user 102 and user 104 complete the required information in the respective display panels 402 asynchronously, the voice bridge controller 308 may receive the OK from one of the user's 102 and 104 before receiving the OK from the other one of the user's 102 and 104. Thus, in step S1012, the voice bridge processor 308 searches the voice bridge memory 306 for an entry under user 104's ID which indicates that user 102's ID is selected as an anonymous voice communication partner.

In step S1014, if either an entry under user 104's ID is not found or if found, the user 102's ID is not indicated as an anonymous voice communication partner (i.e. user 104 selected another user for an anonymous communication partner), the voice bridge processor 308 goes to step S1019; otherwise, the voice bridge processor 308 goes to step S1016. In step S1019, the voice bridge processor 308 searches the voice bridge memory 306 for an entry under the user 102's ID which indicates that user 104's ID is selected as the anonymous voice communication partner and then goes to step S1021. In step S1021, if the above entry is found in the voice bridge memory 306, the voice bridge processor 308 goes to step S1020; otherwise, the voice bridge processor 308 goes to step S1023.

In step S1023, the voice bridge processor 308 creates an entry under the user 102's ID in the voice bridge memory 306 and then goes to step S1020. The created entry indicates that the user 104's ID is selected as the anonymous voice communication partner and contains other information regarding the user 102 such as user 102's telephone number.

In step S1020, the voice bridge processor 308 waits for a preset amount of time. This preset amount of time accounts for a difference between the speed which users 102 and 104 can enter the required information through the respective display panels 402. Other differences in time delay such as access network 100 delays, the processing loads of the on-line service processor 208 and the processing loads of the voice bridge processor 308 are also accounted for by the preset amount of time. After the preset time has expired, the voice bridge processor 308 goes to step S1022. In step S1022, the voice bridge processor 308 increments a count and then goes to step S1024. In step S1024, the voice bridge processor 308 checks if the count has exceeded a maximum value. If the count has exceeded the maximum value, the voice bridge processor 308 goes to step S1026 and ends the anonymous voice communication process and returns control to the on-line service processor 208. The maximum value is preset based on system requirements. If the count has not exceeded the maximum value, the voice bridge processor 308 returns to step S1012 and repeats the above process.

In step S1016, the voice bridge processor 308 reads user 104's telephone number that is contained in the user 104's entry in the voice bridge memory 306 and then goes to step S1018. In step S1017, the voice bridge processor 308 waits for a predetermined amount of time. This predetermined amount of time allows the users 102 and 104 that have connections to only one telephone line to logoff the computer network 100 and release their telephone line so that the telephone can be used for the anticipated anonymous voice communication. This step is optional because the users 102 and 104 may have two telephone line connections and can voice communicate using one telephone line while connected to the access network 100 using the other telephone line.

In step S1018, the voice bridge processor 308 invokes a conference feature of the telephone network through the telephone network interface 310 and signal line 312. Telephone network components such as a private branch exchange (PBX) or the telephone network interface 310 if so equipped dials the two telephone numbers and connects the two telephone numbers in a conference mode. After the conference feature of the telephone network has been successfully invoked, the voice bridge processor 308 goes to step S1026 and ends the anonymous voice communication process leaving the parties to communicate through the telephone network in a conference mode using telephone stations. Thus, neither party is informed of the other party's telephone number but the parties can communicate over the respective telephone stations connected in a conference mode.

The voice bridge processor 308 can also connect more than two users 102 and 104 together for anonymous voice conference communication in a voice room. The anonymous voice conference communication is similar to chatting in a virtual room. The voice bridge processor 308 initiates a conference call when a first user 102 chooses to join an anonymous voice conference communication and then adds additional users such as user 104 to the anonymous voice conference communication when the additional user 104 also enters the same voice room.

Figure 6A:
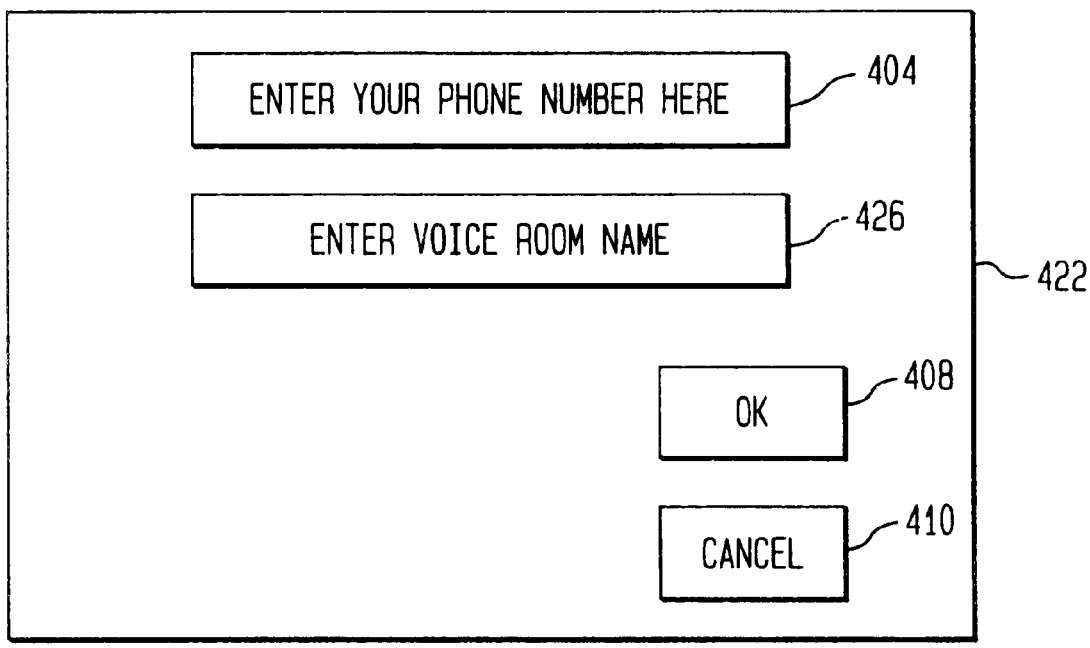
FIGS. 6A–6B are diagrams of a display panel for anonymous voice conference communication.

When a first user 102 selects an anonymous voice conference communication, the voice bridge processor 308 displays display panel 422 to the user 102 on a personal computer display screen for example. In FIG. 6A, the display panel 422 contains similar display areas 404, 408 and 410 as the display panel 402 for anonymous voice communication between two users 102 and 104. However, display area 426 prompts the user 102 to enter a voice room name. The voice room name is the name of the anonymous voice conference. When the anonymous voice conference is established, the voice bridge processor 308 adds the voice room name to a generally available list of voice room names so that other subscribers to the on-line service may view and enter the selected voice room.

Figure 6B:
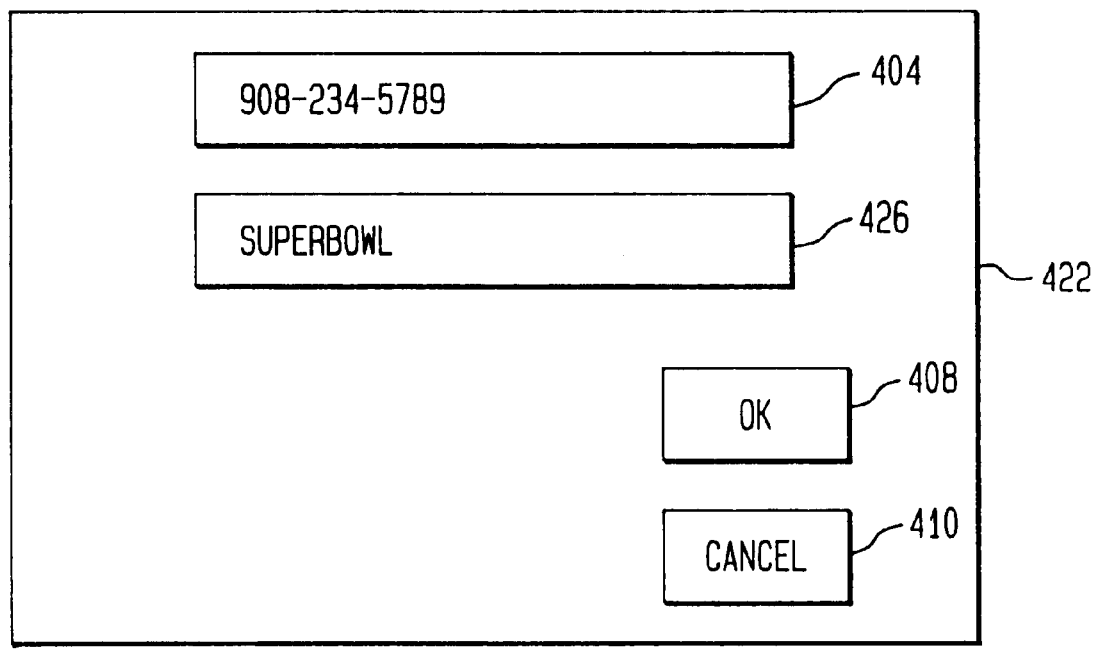

The user 102 enters the required information as shown in FIG. 6B. The user's telephone number "908-234-5789" and the voice room name "superbowl" are entered in the display areas 404 and 426, respectively. After the user selects OK in the display area 408, the voice bridge controller 308 processes the data and either initiates a telephone conference in a telephone network and adds the user 102 as the first conferee or simply adds the user 102 to an ongoing telephone conference. All participating users 102 and 104 are anonymous to each other. Thus, the telephone conference provides for anonymous voice conference communication.

Figure 7:
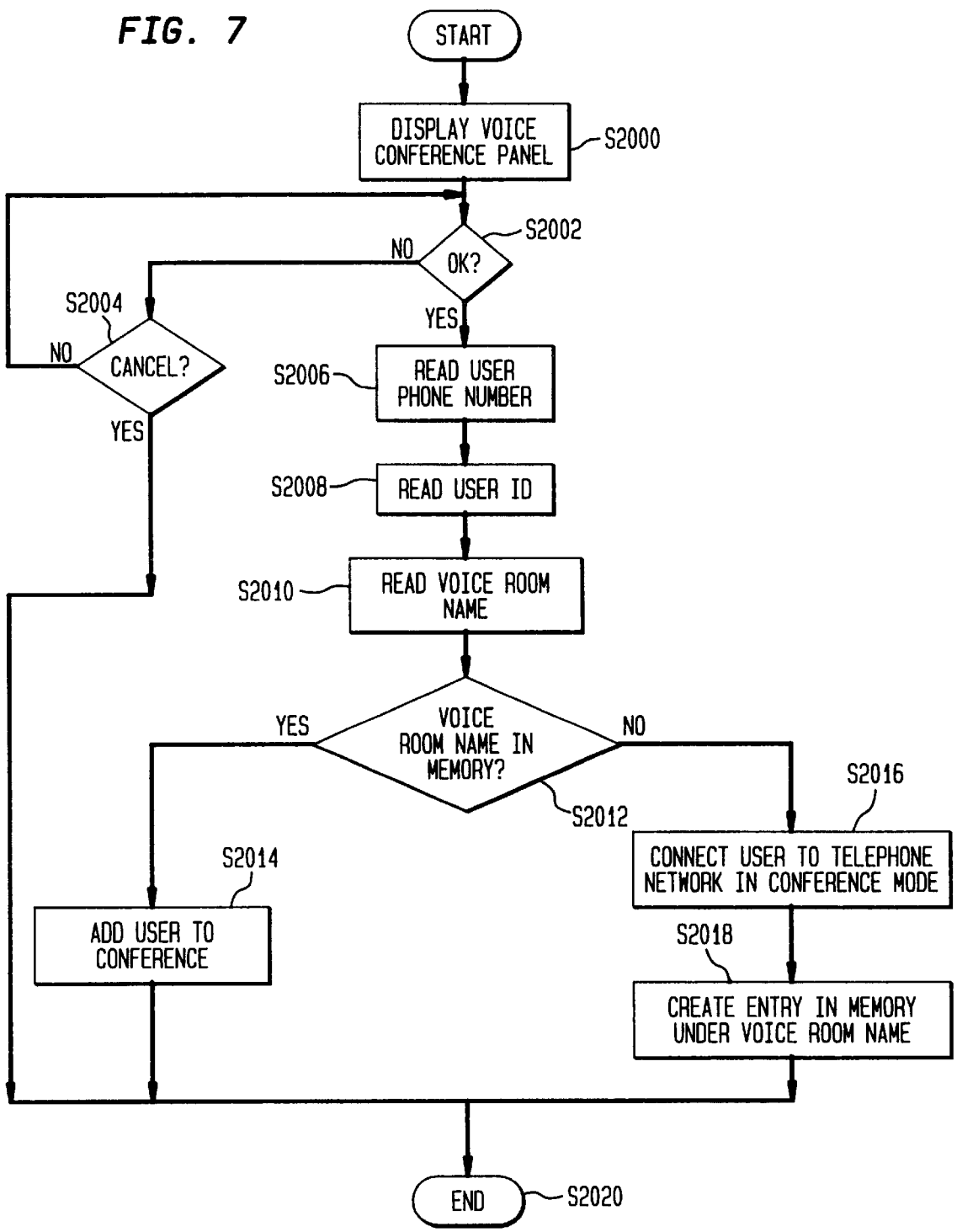
FIG. 7 is a process of the voice bridge processor that provides anonymous voice conference communication.

FIG. 7 shows a process of the voice bridge processor 308 for the anonymous voice conference communication feature. In step S2000, the voice bridge processor 308 displays to the user 102 the display panel 422 and then goes to step S2002. In step S2002, the voice bridge processor 308 checks if the user 102 has selected OK by clicking with a mouse, for example. If the user selects OK, the voice bridge processor 308 goes to step S2006; otherwise, the voice bridge processor 308 goes to step S2004. In step S2004, the voice bridge processor 308 checks if the user 102 has selected CANCEL to cancel the anonymous voice conference communication feature. If the user has selected CANCEL, the voice bridge processor 308 goes to step S2020 and ends the anonymous voice conference communication process; otherwise, the voice bridge processor 308 returns to step S2002.

In step S2006, the voice bridge processor 308 reads the user 102's telephone number and goes to step S2008. In step S2008, the voice bridge processor 308 reads the user 102's ID and goes to step S2010. In step S2010, the voice bridge processor 308 reads the voice room name from the display area 426 and then goes to step S2012.

In step S2012, the voice bridge processor determines whether the voice room name is in the voice bridge memory 306 (i.e., whether the voice room is on the list of on-going voice rooms). If the voice room name is in the voice bridge memory 306, the voice bridge processor 308 goes to step S2014; otherwise, the voice bridge processor 308 goes to step S2016. In step S2014, the voice bridge processor 308 adds the user 102 to an ongoing anonymous voice conference. The voice bridge processor 308 may delay a predetermined amount of time before adding the user 102 to the anonymous voice conference to allow the user 102 to disconnect from the access network 100. Then, the voice bridge processor 308 goes to step S2020 and ends the anonymous voice conference communication process.

In step S2016, the voice bridge processor 308 initiates a telephone conference in a telephone network and then connects the user 102 to the telephone conference after delaying a predetermined amount of time to allow the user to disconnect from the access network 100. Then, the voice bridge processor 308 goes to step S2018. In step S2018, the voice bridge processor 308 creates an entry in the voice bridge memory 306 corresponding to the voice room name and associates with this entry all the necessary information for supporting the anonymous voice conference communication such as the identification of the telephone conference in the telephone network so that other users 104 may be added to the same anonymous voice conference. Then, the voice bridge processor 308 goes to step S2020 and ends the anonymous voice conference communication process.

The voice bridge processor 308 may also implement other necessary functions such as accounting schemes where the users 102 and 104 may select a method for paying for the anonymous voice communication. For example, each of the users 102 and 104 may choose to pay for their portion of the anonymous voice communication costs or, the users 102 and 104 may subscribe to an anonymous voice communication service where a certain number of minutes is covered under a basic rate.

The anonymous voice bridge management unit 210 may be implemented using hardware components or as a program executing in the on-line service processor 208 or as programs distributed over user's personal computers that are connected to each other over the access network 100 via modems. The hardware or programs may display display panels 402, 422 or similar screens and achieve the role of a trusted agent. In the case where the trusted agent is a program executing in the user's personal computers, the telephone numbers of the parties may be represented in coded form, destroyed after use or used with available "Meet-Me" techniques commonly provided by telephone service providers for pagers to maintain anonymity.

While this invention has been described in conjunction with specific embodiments thereof, it is evident that many alternatives, modifications and variation will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A trusted agent, coupled to an access network, that provides for anonymous voice communication using telephones coupled to a voice communications network, comprising:

a network communications unit; and a voice bridge processor coupled to the network communications unit, wherein the voice bridge processor receives information from at least one user through the network communications unit and the access network, the information including a voice room name identifying a voice room, and initiates a connection between the at least one user and the voice room over the voice communications network based on the received information for the anonymous voice communication.

2. The trusted agent of claim 1, wherein the voice bridge processor communicates with the at least one user through the network communications unit and receives from the at least one user a telephone number associated with the first user and an identification associated with at least one anonymous voice communication partner.

3. The trusted agent of claim 2, wherein the voice bridge processor displays to the at least one user a display panel prompting the at least one user to enter the information, the telephone number and the identification.

4. The trusted agent of claim 2, further comprising:

a memory device, wherein the at least one user comprises a first user and a second user, the voice bridge processor reading an identification of the first user from the memory device and searching in the memory device for an entry corresponding to the identification of the second user that also identifies the identification of the first user as an anonymous voice communication partner.

5. The trusted agent of claim 4, wherein if the entry corresponding to the identification of the second user is found in the memory device, then the voice bridge processor connects the first user in the voice room with the second user over the voice communications network, the voice bridge processor connecting the first user with the second user using the telephone number of the first user and a telephone number of the second user contained in the entry corresponding to the identification of the second user.

6. The trusted agent of claim 5, wherein the voice bridge processor waits a preset time before connecting the first user with the second user to allow the first user and the second user to make available telephone lines corresponding to the telephone numbers of the first user and the second user, respectively.

7. The trusted agent of claim 4, wherein if the entry corresponding to the second user is not found, then the voice bridge processor creates an entry in the memory device corresponding to the first user, the entry containing at least the telephone number of the first user, the identification of the first user and the identification of the second user as the anonymous voice communication partner.

8. The trusted agent of claim 2, wherein if the entry corresponding to the voice room name is found, then the voice bridge processor connects the first user to a voice conference corresponding to the voice room name over the voice communications network, the entry corresponding to the voice room name containing information required to connect the first user to the corresponding voice conference.

9. The trusted agent of claim 8, wherein the voice bridge processor waits a preset time before connecting the first user with the voice conference corresponding to the voice room name to allow the first user to make available a telephone line corresponding to the telephone number of the first user.

10. The trusted agent of claim 2, further comprising a memory device, wherein the voice bridge processor searches in the memory device for an entry corresponding to the voice room name, if the entry corresponding to the voice room name is not found, then the voice bridge processor initiates a voice conference corresponding to the voice room name over the voice communications network, connects the first user to the voice conference and creates an entry in the memory device corresponding to the voice room name that includes information which identifies the corresponding voice conference.

11. The trusted agent of claim 10, wherein the voice bridge processor waits a preset time before connecting the first user with the voice conference corresponding to the voice room name to allow the first user to make available a telephone line corresponding to the telephone number of the first user.

12. A method for connecting at least one user to a voice communication room through a trusted agent, coupled to an access network using telephones coupled to a voice communications network, comprising:

receiving information from the at least one user through a network communications unit and the access network, the information including a voice room name identifying a voice room; and initiating a connection between the at least one user and the voice room over the voice communications network based on the received information for the voice communication.

13. The method of claim 12, wherein the receiving step comprises:

communicating with the at least one user using the voice bridge processor through the network communications unit; and receiving from the at least one user a telephone number associated with the at least one user and an identification associated with at least one anonymous voice communication partner.

14. The method of claim 13, wherein the at least one user comprises a first user and a second user and the second user is an anonymous voice communication partner of the first user, the method further comprising:

reading an identification of the first user from a memory device; and searching in the memory device for an entry corresponding to the second user that also identifies the identification of the first user as an anonymous voice communication partner of the second user.

15. The method of claim 14, further comprising:

initiating a connection in the voice room between the first user with the second user over the voice communications network, if the entry corresponding to the identification of the second user is found in the memory device, the voice bridge processor initiating the connection between the first user with the second user using the telephone number of the first user and a telephone number of the second user contained in the entry corresponding to the identification of the second user.

16. The method of claim 14, further comprising:

creating an entry in the memory device corresponding to the first user, if the entry corresponding to the second user is not found in the memory device, the entry containing at least the telephone number of the first user, the identification of the first user and the identification of the second user.

17. The method of claim 14, further comprising:

searching in a memory device for an entry corresponding to the voice room name; and initiating the connection between the first user with a voice conference corresponding to the voice room name over the voice communications network, if the entry corresponding to the voice room name is found in the memory device, the voice bridge processor connecting the first user with the voice conference corresponding to the voice room name using the telephone number of the first user and the information contained in the entry corresponding to the voice room name that identifies the voice conference.

18. The method of claim 17, wherein if the entry corresponding to the voice room name is not found in the memory device, then the method further comprising:

initiating a voice conference corresponding to the voice room name; and creating an entry in the memory device corresponding to the voice room name, the entry containing at least the information identifying the voice conference corresponding to the voice room name.

* * * * *